(12) United States Patent
Debeaux et al.

(10) Patent No.: US 10,087,064 B2
(45) Date of Patent: Oct. 2, 2018

(54) MANAGEMENT OF VEHICLE FUELING SAFETY

(71) Applicant: International Business Machines Corporation, Armonk, NY (US)

(72) Inventors: Matthieu Debeaux, Montpellier (FR); Ivan Deleuze, Montpellier (FR); Guilhaume Garcia, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 14/860,881

(22) Filed: Sep. 22, 2015

(65) Prior Publication Data

US 2017/0081169 A1    Mar. 23, 2017

(51) Int. Cl.
*H04N 7/18* (2006.01)
*B67D 7/32* (2010.01)
*B67D 7/06* (2010.01)

(52) U.S. Cl.
CPC ............... *B67D 7/32* (2013.01); *B67D 7/068* (2013.01); *H04N 7/181* (2013.01)

(58) Field of Classification Search
CPC combination set(s) only.
See application file for complete search history.

(56) References Cited

U.S. PATENT DOCUMENTS

| | | | |
|---|---|---|---|
| 6,021,823 A | 2/2000 | Hale | |
| 6,078,850 A * | 6/2000 | Kane | B60S 5/02 340/439 |
| 6,149,033 A * | 11/2000 | Poleshuk | B67D 7/12 222/75 |
| 6,237,647 B1 | 5/2001 | Pong et al. | |
| 6,334,474 B1 * | 1/2002 | Rababy | B67D 7/3218 137/68.14 |
| 7,051,831 B2 | 5/2006 | Scholer et al. | |
| 2014/0236444 A1 * | 8/2014 | Stefan | B67D 7/065 701/70 |
| 2014/0267741 A1 * | 9/2014 | King | H04N 7/183 348/156 |
| 2014/0311619 A1 * | 10/2014 | Herp | B67D 7/426 141/1 |
| 2017/0050383 A1 * | 2/2017 | Bell | B33Y 10/00 |

OTHER PUBLICATIONS

Matt Soniak, mentalfloss.com, Article, May 22, 2014, What Happens if You Drive Off With the Gas Pump Nozzle Still in the Car?, 7 pages.
Martin Fricker, CCTV at petrol stations will automatically stop uninsured cars being filled with fuel, Mar. 12, 2012, 4 pages.

\* cited by examiner

*Primary Examiner* — Janese Duley
(74) *Attorney, Agent, or Firm* — Schmeiser, Olsen & Watts, LLP; Isaac Gooshaw (57) ABSTRACT

A method and associated system for managing vehicle fuel safety. Input from at least one sensor is received. The input indicates that a fuel pump nozzle of a fuel pump is disengaged from the fuel pump or inserted into a vehicle's tank enclosure. The vehicle adjacent to the fuel pump is monitored to detect when the vehicle is preparing to move or is starting to move away from the fuel pump. An alarm is activated indicating that the fuel pump nozzle is disengaged from the fuel pump, or inserted into the vehicle's tank enclosure, and the vehicle is preparing to move or is starting to move.

20 Claims, 5 Drawing Sheets

MANAGEMENT OF VEHICLE FUELING SAFETY

TECHNICAL FIELD

The present invention relates to a vehicle safety, and more specifically, to management of vehicle fueling safety.

BACKGROUND

It is a common practice to refuel a vehicle at a service station.

BRIEF SUMMARY

A method, and associated system and computer program product, for managing vehicle fuel safety. The method includes receiving input from at least one sensor indicating that a fuel pump nozzle of a fuel pump is disengaged from the fuel pump or inserted into a vehicle's tank enclosure. The method further includes monitoring the vehicle adjacent to the fuel pump to detect when the vehicle is preparing to move or is starting to move away from the fuel pump. The method further includes activating an alarm indicating that the fuel pump nozzle is disengaged from the fuel pump, or inserted into the vehicle's tank enclosure, and the vehicle is preparing to move or is starting to move.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

When a vehicle (e.g., a car) is refueling its tank in a service station, a potential problem arises if the operator of the vehicle is distracted and forgets to unplug the fuel pump nozzle from the vehicle tank and starts driving while the vehicle is still connected to the service station, which can result in the fuel pump nozzle being torn away from the pump housing resulting in a breach of the pump housing and spilt fuel. The preceding scenario is an extremely dangerous scenario with implications for the safety of the service station and other users, which may lead to fire and loss of life.

Therefore, there is a need in the art to address the aforementioned problems.

The described vehicle fueling safety management system of embodiments of the present invention includes instrumentation and a method of use of the instrumentation at a fuel pump. A fuel pump may be provided at a service station either in a group of fuel pumps or as a single pump. A fuel pump is used to provide fuel in the form of petrol, diesel, gas, or other form of fuel to a vehicle. A fuel pump pumps the fuel from a storage tank (e.g., the storage tank may be underground beneath the fuel pump) into a vehicle via a pump nozzle which is inserted into the vehicle's fuel tank.

A fuel pump may be provided with one or more security sensors that can detect when the refueling is on-going. The refueling of a vehicle can be monitored with sensors which are connected to a management server running management software.

The management software has a capability to analyze a live feed of a video camera or other movement sensor(s) in order to detect if a driver is likely to drive away while the fuel pump nozzle is plugged into the vehicle's fuel tank.

Instrumentation may be added to a regular service station by implementing sensors at a fuel pump and/or a nozzle of the fuel pump in order to monitor a status of the fuel pump and/or the nozzle of the fuel pump.

Figure 1:
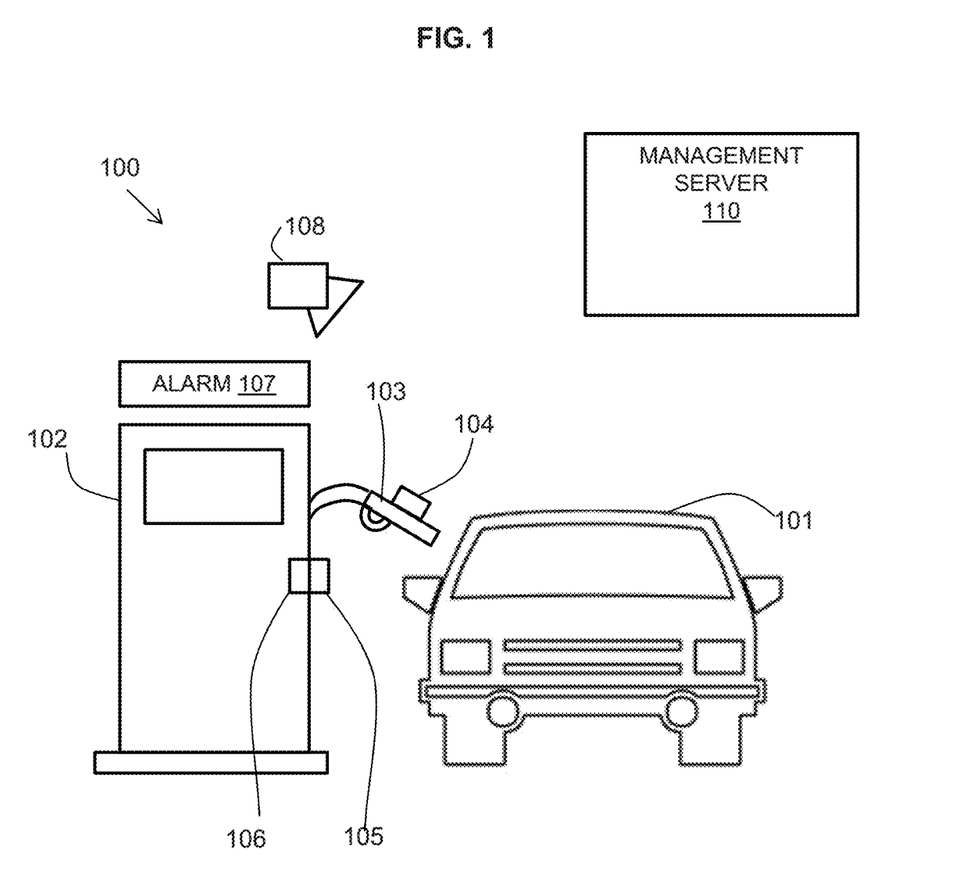
FIG. 1 is a schematic diagram of an embodiment of a vehicle fueling safety management system.

FIG. 1 is a schematic diagram of an embodiment of a vehicle fueling safety management system 100.

A vehicle 101 may pull up, park and turn off its engine adjacent a fuel pump 102 in a service station. The service station may include multiple fuel pumps, each of which may be used to deliver fuel via a hose and nozzle 103 to a fuel tank of the vehicle 101.

The vehicle 101 may have a fuel tank cap that is removed by an operator before the fuel pump nozzle 103 is inserted into the opening to the fuel tank. When not in use, the fuel pump nozzle 103 may be held by a cradle 105, which in one embodiment, is located on a side of the fuel pump 102.

Users typically make payment using a payment card at an automated pump payment system at the fuel pump 102 or they pay in person at a kiosk or front desk of the service station either before or after the input of the fuel into the vehicle 101.

In the described system, a movement monitor 108 is capable of monitoring a movement of the vehicle 101 when the vehicle 101 is parked at the fuel pump 102.

In one embodiment, the movement monitor 108 may be a video camera, which may record the movement and activity around the vehicle 101. The camera may be directed at the front of the vehicle 101 or multiple cameras may cover different angles of the vehicle 101. In one embodiment, the video camera may be an existing camera apparatus installed for surveillance of the service station and vehicles.

In one embodiment, the movement monitor 108 may be a movement sensor which may sense a movement of the vehicle 101 parked adjacent the fuel pump 102. The movement sensor may be provided on the fuel pump 102 directed towards the position in which the vehicle 101 would park when refueling and may monitor a relative movement of the vehicle 101 and the fuel pump 102. In response to a movement of the vehicle 101 being detected, the movement monitor 108 may activate an alert.

The described system may include a first sensor 104 provided on the nozzle 103 of the fuel pump 102. A second sensor 106 may be provided on the cradle 105 for the nozzle 103 on the fuel pump 102, in which the nozzle 103 is stored when not in use.

In one embodiment, the first and second sensors 104, 106 may work in cooperation to sense when the nozzle 103 is in the cradle 105, for example, by detecting the proximity of each other (e.g., by detecting the separation distance between the first and second sensors 104, 106).

In another embodiment, only the first sensor 104 may be provided (with the second sensor 106 not present) and may sense when the nozzle 103 is moved from the cradle 105 and/or inserted into a vehicle fuel tank. This may be implemented by the first sensor 104 on the nozzle 103 detecting the surrounding vehicle tank, for example, by blocking or reflecting an infrared signal from the first sensor 104.

As a further embodiment, only the second sensor 106 may be provided at the cradle 105 (with the first sensor 104 not present) which may sense when the nozzle 103 is not in the cradle 105. In this further embodiment, the second sensor 106 may be in the form of a pressure sensor that detects when the nozzle's weight is in the cradle 105.

The first and second sensors 104, 106 may each be any suitable form of sensor such as a transducer or electronic chip that provides a signal when a predetermined arrangement of the nozzle arises.

An alarm 107 may include a noise alarm, a visual alarm, a communication to a party, or any combination of alerting mechanisms.

A management server 110 may be provided for receiving inputs from the movement monitor 108 and the first and/or second sensors 104, 106 and for executing management software to analyze the activity at the fuel pump 102 and to activate the alarm 107 if required.

The management software may be configured to activate the alarm 107 if the vehicle 101 shows an indication that the vehicle 101 is moving or is about to move away from the fuel pump 102 while the nozzle 103 is still in the opening to the fuel tank of the vehicle 101. A non-activation of the alarm 107 indicates that the nozzle 103 is correctly unplugged from the vehicle 101 before the vehicle 101 moves away.

In the described method, the fuel delivery process is monitored to verify that the fuel pump nozzle is correctly removed from the vehicle tank and plugged back into the nozzle cradle of the fuel pump. Current video technologies may be implemented to analyze a video stream of the refueling process, coupled with sensor instrumentation at the fuel pump nozzle.

Figure 2:
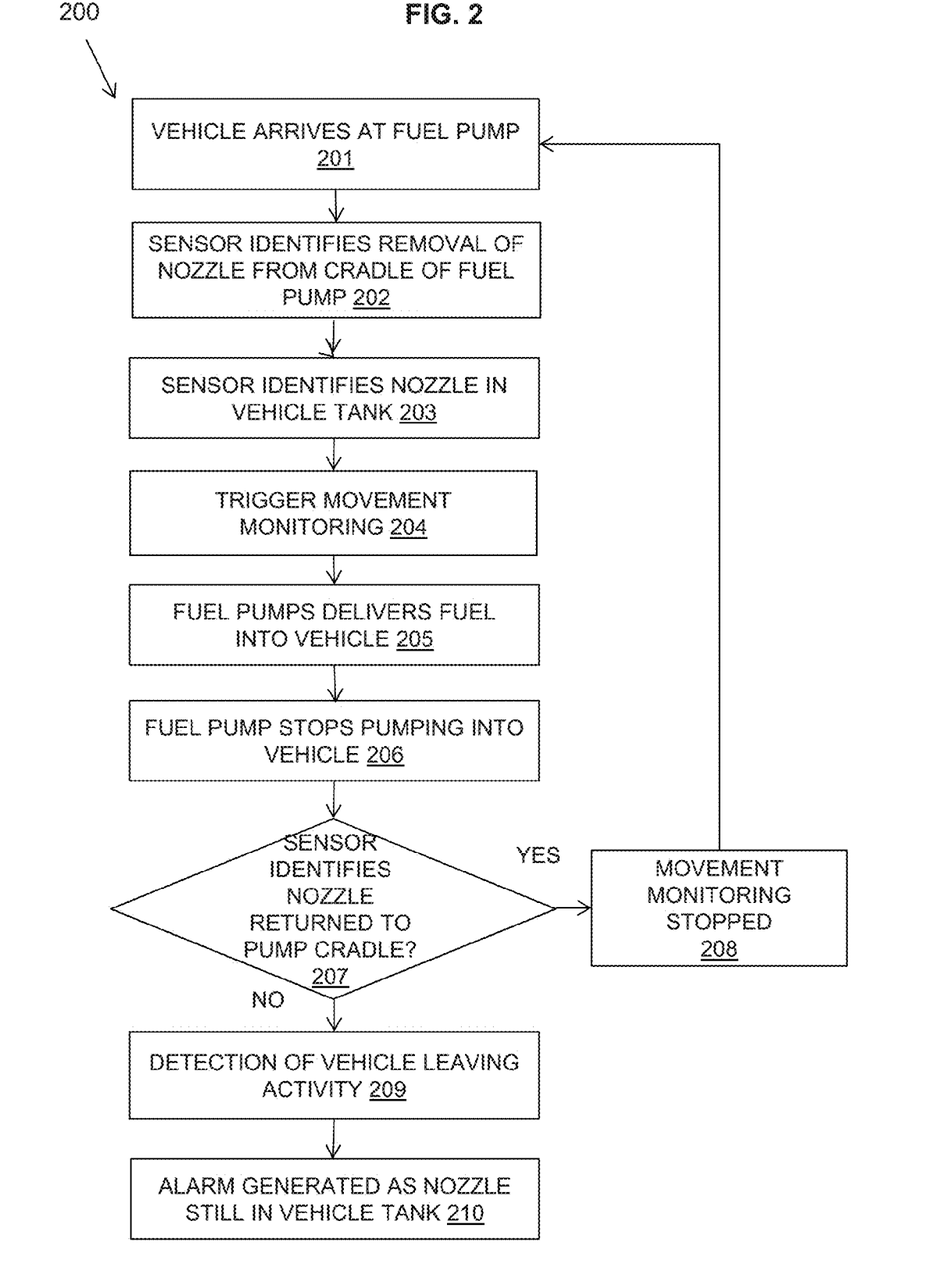
FIG. 2 is a flow diagram of an example embodiment of a method of vehicle fueling safety management.

Referring to FIG. 2, a flow diagram 200 shows an example embodiment of a method of vehicle fueling safety management.

In step 201, the vehicle 101 arrives at the fuel pump 102 and stops adjacent the fuel pump and switches off the engine of the vehicle 101.

In step 202, a sensor or a combination of sensors at one or both of the fuel pump nozzle and fuel pump nozzle cradle, may identify the removal of the nozzle from the cradle of the fuel pump. Alternatively or additionally in step 203, a sensor on the fuel pump nozzle may identify that the nozzle is inserted into the vehicle's fuel tank.

A movement monitoring is triggered in step 204. The movement monitoring may be triggered by one or both of the sensing steps 202, 203. Alternatively, the movement monitoring may be continuous.

In one embodiment, the movement monitoring may be by a video camera which supplies a live video feed of the vehicle for analysis. In another embodiment, the movement monitoring may be by a sensor that monitors when a vehicle moves away from a fuel pump. In a yet further embodiment, the movement monitoring may be carried out by a sound sensor that senses when a vehicle engine is started. Other forms of movement monitoring may also be provided with the function of providing an indication of when a vehicle makes preparation to move away from a fuel pump, or starts to move away from a fuel pump.

In step 205, the fuel pump delivers fuel into the vehicle. In step 206, the fuel pump stops pumping fuel into the vehicle.

Step 207 determines whether the one or more sensors have identified the nozzle being removed from the vehicle and/or returned to the cradle. If so, the movement monitoring is stopped in step 208, followed by looping back to step 201 when a new vehicle arrives at the fuel pump and fuel is again delivered.

If it has not been identified that the nozzle has been removed from the vehicle and/or returned to the cradle, the method may proceed and continue to monitor for movement of the vehicle.

In step 209, the movement monitoring detects the vehicle leaving activity in the form of the vehicle preparing to or starting to move away from the fuel pump. As the nozzle has not been identified as returning to the pump cradle or being removed from the vehicle fuel tank, step 210 generates an alarm indicating that the nozzle is still in the vehicle tank.

Figure 3:
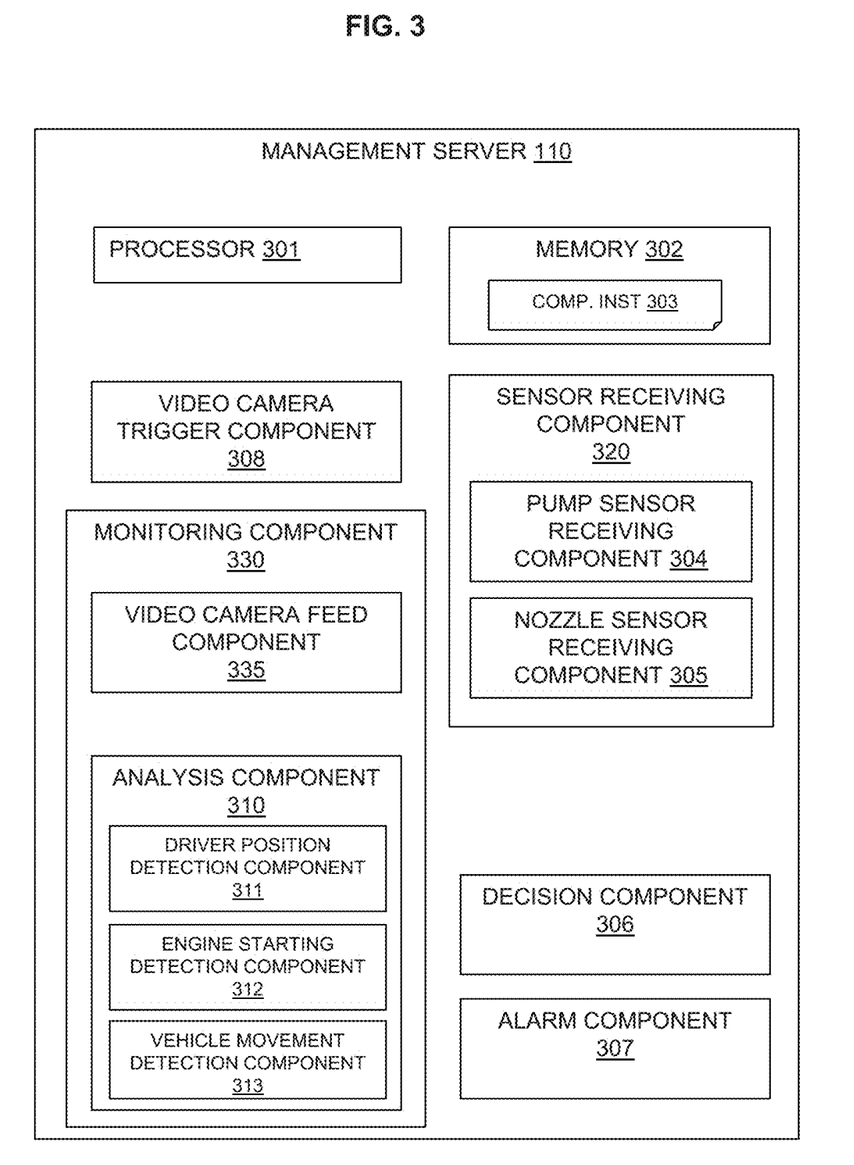
FIG. 3 is block diagram of a first example embodiment of a management server of a vehicle fueling safety management system.
Figure 4:
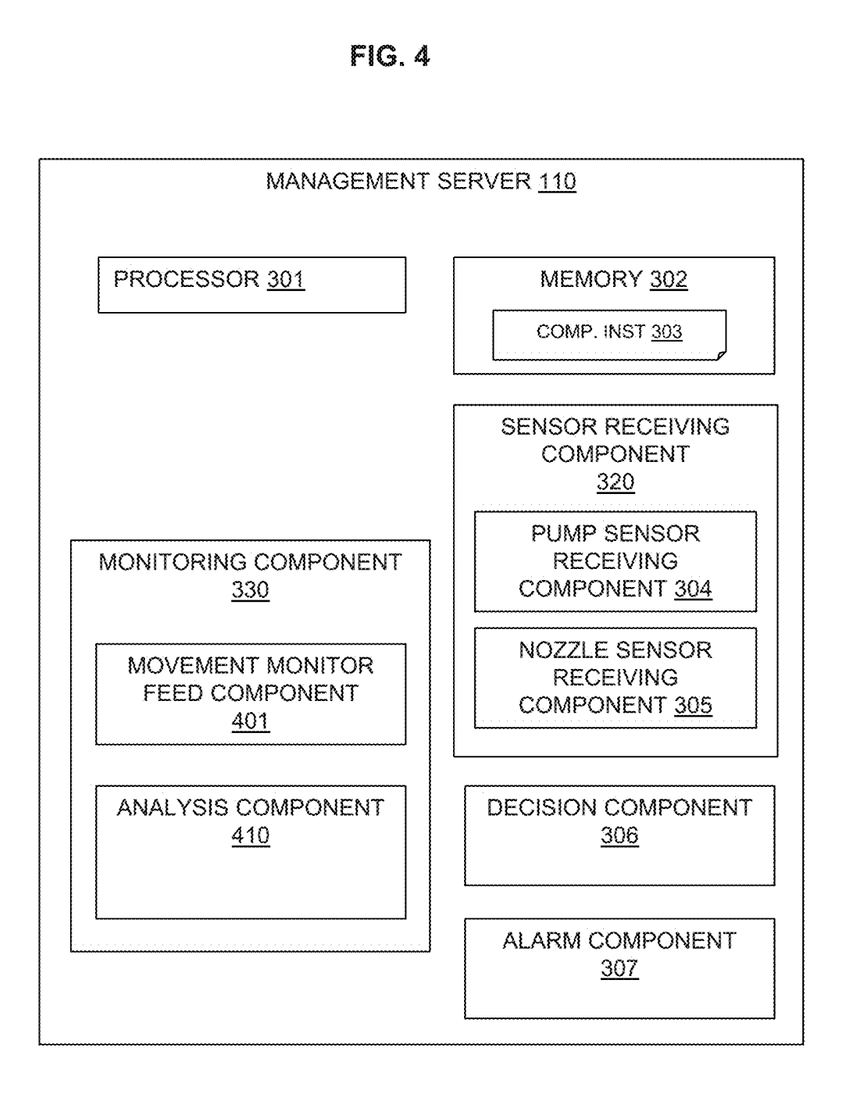
FIG. 4 is block diagram of a second example embodiment of a management server of a vehicle fueling safety management system.

Referring to FIGS. 3 and 4, first and second example embodiments of a management server 110 of a vehicle fueling safety management system are respectively shown providing the described functionality. The management server 110 may be provided as a security system included in a developer application for managing service stations in the travel and transportation industry.

The management server 110 may include at least one processor 301, a hardware module, or a circuit for executing the functions of the described components which may be software units executing on the at least one processor. Memory 302 may be configured to provide computer instructions 303 to the at least one processor 301 to carry out the functionality of components 308, 330, 320, 306, and 307. The management server 110 may include components in the form of software units providing functionality when executed by the at least one processor 301.

The management server 110 of both FIGS. 3 and 4 may include a sensor receiving component 320 for receiving sensor signals from one or more sensors. The sensor receiving component 320 may include a pump sensor receiving component 304 for receiving sensor signals from a fuel pump sensor, which may be a sensor provided on the cradle of the fuel pump to sense when the fuel pump nozzle is in its idle position in the cradle. Additionally or alternatively, the sensor receiving component 320 may include a nozzle sensor receiving component 305 for receiving sensor signals from a fuel pump nozzle sensor. The nozzle sensor receiving component 320 may sense when the nozzle is removed from the fuel pump cradle and/or may sense whether the nozzle is inserted into a vehicle's fuel tank.

Various different sensor arrangements may be provided with the function of sensing when a fuel pump nozzle is in use. For example, a single sensor may be provided on a fuel pump nozzle capable of sensing when the nozzle is in a vehicle's tank. This may be sensing the proximity around of the nozzle end of the vehicle's tank opening. The sensor may be, for example, an infrared sensor with radial beams which are interrupted by being surrounded by the opening of a vehicle tank.

In another example, a first sensor may be provided on a fuel pump nozzle and a second sensor provided on a fuel pump cradle. When the first and second sensors are in close proximity, they may detect each other and a signal may be transmitted, wherein the transmitted signal indicates that the nozzle is in the cradle.

In a yet further example, a single sensor may be provided on the fuel pump cradle and may sense when the nozzle is not in the cradle. The single sensor may be a pressure sensor for sensing the weight of the fuel pump nozzle in the cradle.

The management server 110 may also include a monitoring component 330 for monitoring a vehicle adjacent a fuel pump to detect when the vehicle is preparing to move or starting to move away from the fuel pump.

In the example embodiment of FIG. 3, the monitoring component 330 receives input from a movement monitor in the form of one or more video cameras. The monitoring component 330 may include a video camera feed component 335 for receiving a live video feed of a vehicle at a fuel pump of a service station. The one or more video cameras may be an existing installation, for example, a closed-circuit television (CCTV) installation at the service station that may be used for the described additional function.

A video camera trigger component 308 may start and end the operation of the video camera in response to sensor signals received by one or both of the pump sensor receiving component 304 and the nozzle sensor receiving component 305. Alternatively, the video camera may provide a continuous video feed.

The monitoring component 330 may include an analysis component 310 that may be provided for analyzing the video camera feed as received by the video camera feed component 335. The analysis component 310 may use analysis techniques to determine from the video camera feed, if a vehicle is about to move away from a fuel pump or is starting to move away.

The analysis component 310 may include a driver position detection component 311 for determining if a driver is in the driving seat of the vehicle. If the fuel pump is a self-service pump, the driver position detection component 311 may indicate that the driver has forgotten to remove the nozzle from the vehicle's tank and is preparing to drive away.

The analysis component 310 may include an engine starting detection component 312 which may use sound from the video camera stream to determine that the vehicle engine has started indicating that the vehicle is likely to move away.

The analysis component 310 may include a vehicle movement detection component 313 for detecting movement of the vehicle from the video camera feed.

A decision component 306 may be provided for evaluating the outcome of the analysis component 310 and sensor signals from one or both of the pump sensor receiving component 304 and the nozzle sensor receiving component 305 to determine if an alarm should be activated. An alarm component 307 may be activated by the decision component 306. The alarm component 307 may include an audio alarm, a visual alarm such as a flashing light, a message alert to a manager, etc.

In the example embodiment of FIG. 4, a movement monitor is provided in the form of a movement sensor and the monitoring component 330 may include a movement sensor feed component 401 for receiving an indication if a vehicle starts to move away from a fuel pump of a service station. For example, a movement sensor may be in the form of an infrared sensor on a fuel pump, whose beam is interrupted when a vehicle is positioned adjacent to the fuel pump. The movement sensor may also include a sound sensor for determining if a vehicle's engine has been started.

The monitoring component 330 of FIG. 4 may include an analysis component 410 that may be provided for analyzing the movement monitor signal as received by the movement monitor feed component 401. The analysis component 410 may use analysis techniques to determine from the movement monitor, if a vehicle is preparing or starting to move away.

As in FIG. 3, a decision component 306 is provided for evaluating an outcome of the analysis component 410 and sensor signals from one or both of the pump sensor receiving component 304 and the nozzle sensor receiving component 305 to determine if an alarm should be activated. An alarm component 307 may be activated by the decision component 306. The alarm component 307 may include an audio alarm, a visual alarm such as a flashing light, a message alert to a manager, etc.

Figure 5:
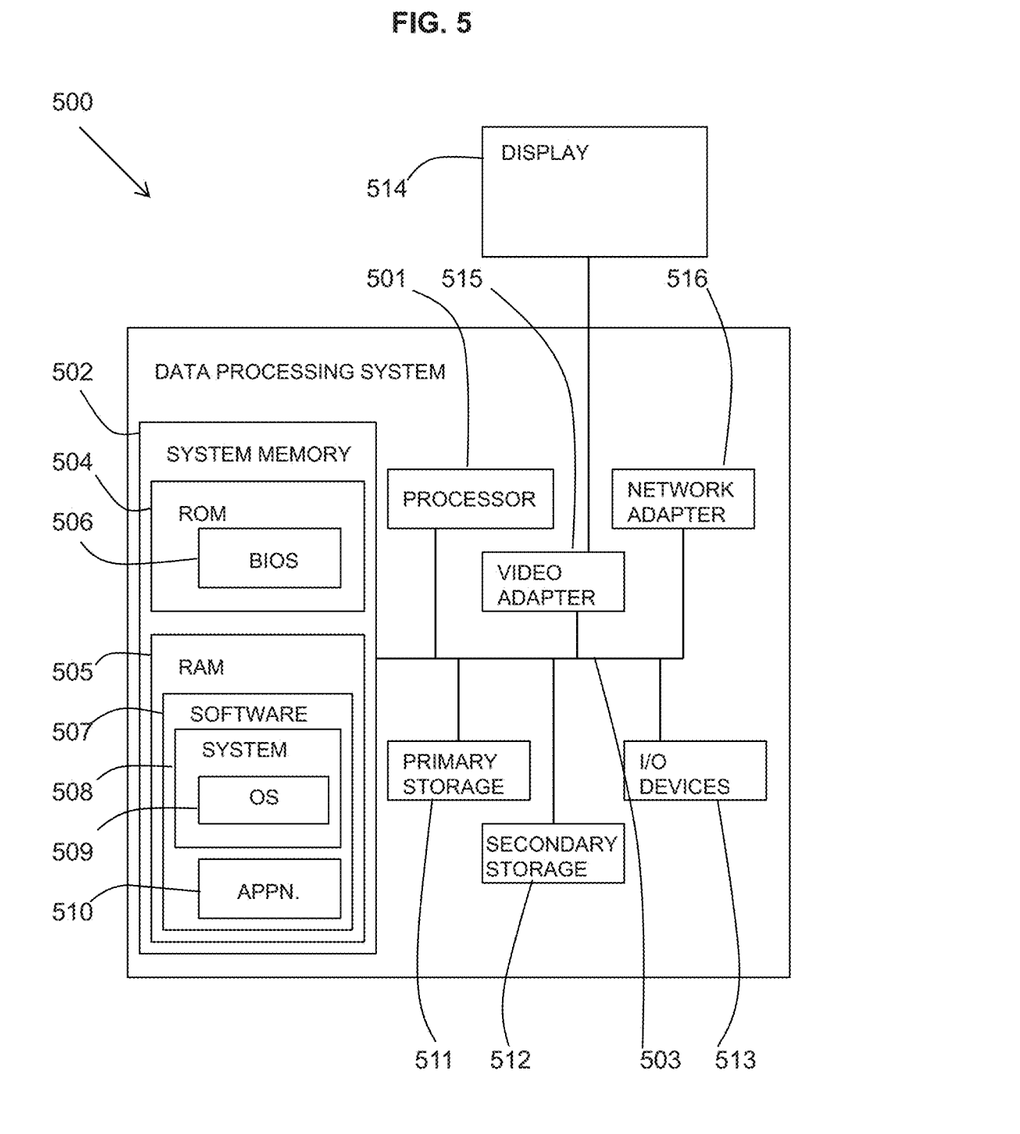
FIG. 5 is a block diagram of an embodiment of a computer system in which the described method and system may be implemented.

FIG. 5 is a block diagram of an embodiment of a data processing system 500 in which the described method and system may be implemented. Data processing system 500 is suitable for storing and/or executing program code and includes at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508 such as operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions such as computer instructions 303, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable hardware storage device having computer readable program code stored therein, said program code containing instructions executable by a processor to implement the methods of the present invention.

A system of the present invention comprises a processor, a memory, and a computer readable hardware storage device, said storage device containing program code executable by the processor via the memory to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for managing vehicle fuel safety, said method comprising:
   receiving input from at least one sensor indicating that a fuel pump nozzle of a fuel pump is disengaged from a fuel pump cradle of the fuel pump or inserted into a vehicle's tank enclosure, wherein the at least one sensor is selected from the group consisting of a first sensor on the fuel pump nozzle and configured to sense whether the fuel pump nozzle is inserted or is not inserted into the vehicle's tank enclosure, a second sensor on the fuel pump cradle and configured to sense whether the fuel pump nozzle is in or is not in the fuel pump cradle, and a combination thereof;
   monitoring the vehicle adjacent to the fuel pump, said monitoring the vehicle detecting that the vehicle is preparing to move or is starting to move away from the fuel pump while the fuel pump nozzle is inserted into the vehicle's tank enclosure; and
   activating an alarm indicating a condition of the fuel pump nozzle not being in the fuel pump cradle or being inserted into the vehicle's tank enclosure, and the vehicle is preparing to move or is starting to move, wherein the condition presents a dangerous scenario of the fuel pump nozzle being torn away from a pump housing of the fuel pump resulting in breach of the pump housing and spilt fuel and consequent risk of fire and loss of life.

2. The method of claim 1, wherein said receiving input from the at least one sensor comprises receiving input from the first sensor indicating that the fuel pump nozzle is inserted into the vehicle's tank enclosure.

3. The method of claim 1, wherein said receiving input from the at least one sensor comprises receiving input from the second sensor indicating that the fuel pump nozzle is not in the fuel pump cradle.

4. The method of claim 1, wherein said monitoring the vehicle adjacent to the fuel pump comprises monitoring an area adjacent the fuel pump with one or more video cameras.

5. The method of claim 4, wherein said monitoring the vehicle adjacent to the fuel pump includes receiving a live video feed of the one or more video cameras, and wherein the method further comprises:
   analyzing the live video feed to determine if the vehicle is preparing to move or is starting to move away from the fuel pump.

6. The method of claim 4, wherein the method further comprises:
   triggering monitoring the vehicle adjacent to the fuel pump in response to receiving input from the at least one sensor indicating that the fuel pump nozzle of the fuel pump is disengaged from the fuel pump or inserted into the vehicle's tank enclosure.

7. The method of claim 1, wherein said monitoring the vehicle adjacent to the fuel pump comprises monitoring an area adjacent the fuel pump with a relative movement sensor for monitoring relative movement between the vehicle and the fuel pump.

8. The method of claim 1, wherein said monitoring the vehicle adjacent to the fuel pump comprises using a noise sensor to determine if the vehicle's engine is started.

9. A system, comprising: a processor, a computer readable storage device, a memory, computer program instructions stored in the computer readable storage device and executable by the processor via the memory to implement a method for managing vehicle fuel safety, said method comprising:
   receiving input from at least one sensor indicating that a fuel pump nozzle of a fuel pump is disengaged from a fuel pump cradle of the fuel pump or inserted into a vehicle's tank enclosure, wherein the at least one sensor is selected from the group consisting of a first sensor on the fuel pump nozzle and configured to sense whether the fuel pump nozzle is inserted or is not inserted into the vehicle's tank enclosure, a second sensor on the fuel pump cradle and configured to sense whether the fuel pump nozzle is in or is not in the fuel pump cradle, and a combination thereof;
   monitoring the vehicle adjacent to the fuel pump, said monitoring the vehicle detecting that the vehicle is preparing to move or is starting to move away from the fuel pump while the fuel pump nozzle is inserted into the vehicle's tank enclosure; and
   activating an alarm indicating a condition of the fuel pump nozzle not being in the fuel pump cradle or being inserted into the vehicle's tank enclosure, and the vehicle is preparing to move or is starting to move, wherein the condition presents a dangerous scenario of the fuel pump nozzle being torn away from a pump housing of the fuel pump resulting in breach of the pump housing and spilt fuel and consequent risk of fire and loss of life.

10. The system of claim 9, wherein said receiving input from the at least one sensor comprises receiving input from the first sensor indicating that the fuel pump nozzle is inserted into the vehicle's tank enclosure.

11. The system of claim 9, wherein said receiving input from the at least one sensor comprises receiving input from the second sensor indicating that the fuel pump nozzle is not in the fuel pump cradle.

12. The system of claim 9, wherein said monitoring the vehicle adjacent to the fuel pump comprises monitoring an area adjacent the fuel pump with one or more video cameras.

13. The system of claim 12, wherein said monitoring the vehicle adjacent to the fuel pump includes receiving a live video feed from the one or more video cameras, and wherein the method further comprises:
   analyzing the live video feed to determine if the vehicle is preparing to move or is starting to move away from the fuel pump.

14. The system of claim 12, wherein the method further comprises:
   triggering monitoring the vehicle adjacent to the fuel pump in response to receiving input from the at least one sensor indicating the fuel pump nozzle of the fuel pump is disengaged from the fuel pump or inserted into the vehicle's tank enclosure.

15. The system of claim 9, wherein said monitoring comprises:
  monitoring an area adjacent to the fuel pump with a relative movement sensor.

16. The system of claim 9, wherein the method further comprises:
  receiving a signal from a noise sensor to determine if the vehicle's engine is started.

17. A computer program product, comprising: a computer readable hardware storage device having computer readable program code stored therein, said program code containing instructions executable by a processor to implement a method for managing vehicle fuel safety said method comprising:
  receiving input from at least one sensor indicating that a fuel pump nozzle of a fuel pump is disengaged from a fuel pump cradle of the fuel pump or inserted into a vehicle's tank enclosure, wherein the at least one sensor is selected from the group consisting of a first sensor on the fuel pump nozzle and configured to sense whether the fuel pump nozzle is inserted or is not inserted into the vehicle's tank enclosure, a second sensor on the fuel pump cradle and configured to sense whether the fuel pump nozzle is in or is not in the fuel pump cradle, and a combination thereof;
  monitoring the vehicle adjacent to the fuel pump, said monitoring the vehicle detecting that the vehicle is preparing to move or is starting to move away from the fuel pump while the fuel pump nozzle is inserted into the vehicle's tank enclosure; and
  activating an alarm indicating a condition of the fuel pump nozzle not being in the fuel pump cradle or being inserted into the vehicle's tank enclosure, and the vehicle is preparing to move or is starting to move, wherein the condition presents a dangerous scenario of the fuel pump nozzle being torn away from a pump housing of the fuel pump resulting in breach of the pump housing and spilt fuel and consequent risk of fire and loss of life.

18. The computer program product of claim 17, wherein said receiving input from the at least one sensor comprises receiving input from the first sensor indicating that the fuel pump nozzle is inserted into the vehicle's tank enclosure.

19. The computer program product of claim 17, wherein said receiving input from the at least one sensor comprises receiving input from the second sensor indicating that the fuel pump nozzle is not in the fuel pump cradle.

20. The computer program product of claim 17, wherein said monitoring the vehicle adjacent to the fuel pump comprises monitoring an area adjacent the fuel pump with one or more video cameras.

* * * * *